(12) United States Patent
Dahlman et al.

(10) Patent No.: US 10,263,820 B2
(45) Date of Patent: *Apr. 16, 2019

(54) CHANNEL SOUNDING USING MULTIPLE SOUNDING CONFIGURATIONS

(71) Applicant: Telefonaktiebolaget LM Ericsson (publ), Stockholm (SE)

(72) Inventors: Erik Dahlman, Bromma (SE); Ylva Jading, Stockholm (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 73 days.

This patent is subject to a terminal disclaimer.

(21) Appl. No.: 15/047,190

(22) Filed: Feb. 18, 2016

(65) Prior Publication Data

US 2016/0164708 A1 Jun. 9, 2016

Related U.S. Application Data

(63) Continuation of application No. 12/672,324, filed as application No. PCT/EP2008/057559 on Jun. 16, 2008, now Pat. No. 9,300,495.

(Continued)

(51) Int. Cl.
*H04W 4/00* (2018.01)
*H04L 27/26* (2006.01)
(Continued)

(52) U.S. Cl.
CPC ........ *H04L 27/2613* (2013.01); *H04L 5/0051* (2013.01); *H04L 25/0226* (2013.01)

(58) Field of Classification Search
CPC ...................................... H04L 5/0051
(Continued)

(56) References Cited

U.S. PATENT DOCUMENTS 7,643,832 B2 * 1/2010 Cudak ..................... H04L 5/005
455/436
7,668,555 B2 2/2010 Jin
(Continued)

OTHER PUBLICATIONS

LG Electronics, "Further Considerations on UL Soundings RS", 3GPP TSG RAN WG1 #49bis, Orlando, US, Jun. 25, 2007, pp. 1-7, R1-072876, 3GPP.

(Continued)

*Primary Examiner* — Guang W Li
(74) *Attorney, Agent, or Firm* — Coats & Bennett, PLLC

(57) ABSTRACT

More than one set of sounding signal configuration parameters are determined for the same mobile terminal. The mobile terminal uses the sets of configuration parameters to generate different sounding reference signals which can be used for different purposes such as estimating timing and channel quality. In one embodiment, a method of configuring uplink sounding transmissions by mobile terminals in a wireless communication network is characterized by determining different sets of configuration parameters for sounding signal transmissions for a given mobile terminal (200). The different sets of configuration parameters are transmitted to the mobile terminal, allowing the mobile terminal to generate different sounding signals for different uses by the wireless communication network (202).

24 Claims, 3 Drawing Sheets

Related U.S. Application Data

(60) Provisional application No. 60/954,734, filed on Aug. 8, 2007.

(51) Int. Cl.
*H04L 5/00* (2006.01)
*H04L 25/02* (2006.01)

(58) Field of Classification Search
USPC .......................................................... 370/328
See application file for complete search history.

(56) References Cited

U.S. PATENT DOCUMENTS

| | | | |
|---|---|---|---|
| 8,086,272 B2* | 12/2011 | Teo ...................... | H04B 7/0691 370/208 |
| 8,102,809 B2 | 1/2012 | Muharemovic et al. | |
| 8,179,824 B2* | 5/2012 | Seong ................ | H04W 72/085 370/281 |
| 8,259,700 B2* | 9/2012 | Li ......................... | H04L 5/0051 370/345 |
| 8,831,042 B2* | 9/2014 | Kim ........................ | H04B 1/69 370/344 |
| 8,902,874 B2 | 12/2014 | Chun et al. | |
| 8,976,836 B2 | 3/2015 | Ro et al. | |
| 8,982,813 B2* | 3/2015 | Kwon .................. | H04L 5/0007 370/329 |
| 9,713,096 B2* | 7/2017 | Lee ...................... | H04L 5/0007 |
| 2003/0060175 A1 | 3/2003 | Rosenfeld | |
| 2004/0170157 A1 | 9/2004 | Kim et al. | |
| 2005/0170781 A1* | 8/2005 | Jacobsen ............... | H04L 1/0001 455/67.11 |
| 2006/0034163 A1 | 2/2006 | Gore et al. | |
| 2006/0034165 A1 | 2/2006 | Levy | |
| 2008/0014892 A1 | 1/2008 | Aldana | |
| 2008/0039098 A1 | 2/2008 | Papasakellariou et al. | |
| 2008/0051145 A1* | 2/2008 | Jin ........................ | H04B 7/022 455/561 |
| 2008/0095268 A1* | 4/2008 | Aldana ................ | H04B 7/0691 375/299 |
| 2009/0028112 A1* | 1/2009 | Attar .................... | H04W 36/245 370/332 |
| 2009/0042615 A1* | 2/2009 | Teo ........................ | H04B 7/061 455/562.1 |
| 2009/0316756 A1* | 12/2009 | Ro ........................ | H04B 7/0684 375/133 |
| 2010/0080187 A1* | 4/2010 | Papasakellariou .... | H04L 5/0051 370/329 |
| 2010/0113077 A1 | 5/2010 | Lee et al. | |
| 2010/0135273 A1 | 6/2010 | Kim | |
| 2010/0167743 A1 | 7/2010 | Palanki et al. | |
| 2010/0220614 A1* | 9/2010 | Seong ................... | H04L 5/0051 370/252 |
| 2010/0285762 A1 | 11/2010 | Ko et al. | |
| 2010/0309834 A1 | 12/2010 | Fischer et al. | |
| 2011/0086644 A1* | 4/2011 | Dahlman .............. | H04W 99/00 455/450 |
| 2011/0098054 A1 | 4/2011 | Gorokhov et al. | |
| 2011/0110398 A1* | 5/2011 | Zhang .................. | H04L 5/0051 375/132 |
| 2011/0142095 A1* | 6/2011 | Guo ...................... | H04B 7/0613 375/133 |
| 2011/0268028 A1* | 11/2011 | Stern-Berkowitz ......................... | H04L 5/0048 370/328 |
| 2012/0044906 A1* | 2/2012 | Chen ...................... | H04L 5/001 370/329 |

OTHER PUBLICATIONS

LG Electronics, "Further Considerations on UL Soundings RS", 3GPP TSG RAN WG1 #49, Kobe, Japan, May 7, 2007, pp. 1-7, R1-072341, 3GPP.

Motorola, "Considerations and Recommendations for UL Sounding RS", 3GPP TSG RAN WG1 #49bis, Orlando, USA, Jun. 25, 2007, pp. 1-6, R1-072688, 3GPP.

Vook, F. W. et al. "Uplink Channel Sounding for TDD OFDMA." IEEE 802.16 Broadband Wireless Access Working Group, IEEE C802.16e-04/263r3, XP003015283, Aug. 31, 2004, pp. 0-11.

* cited by examiner

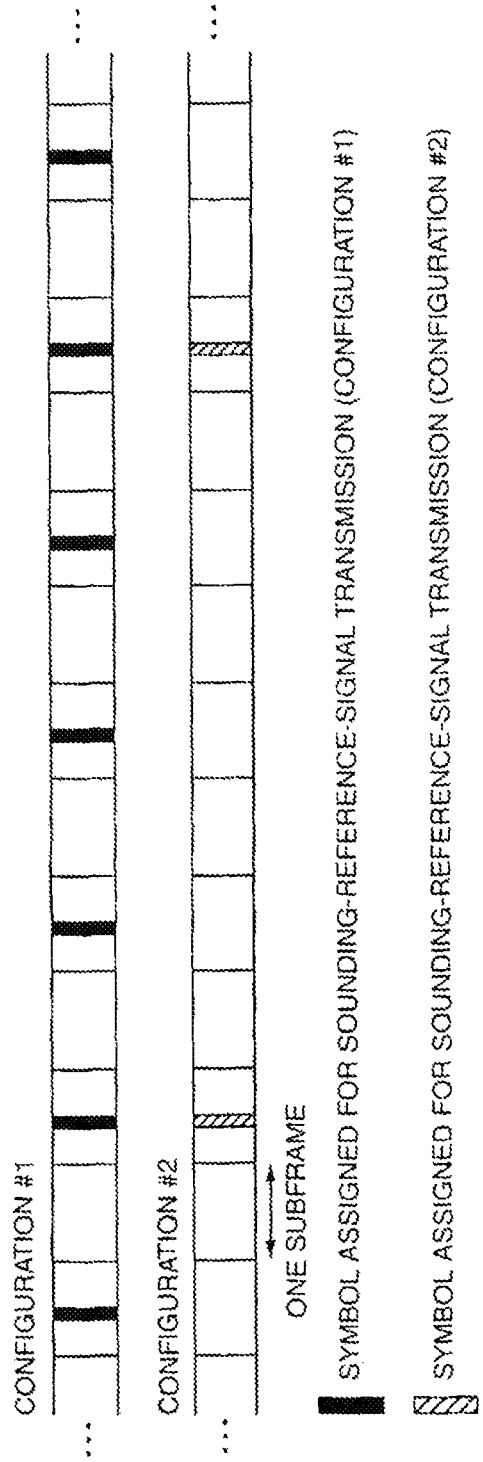
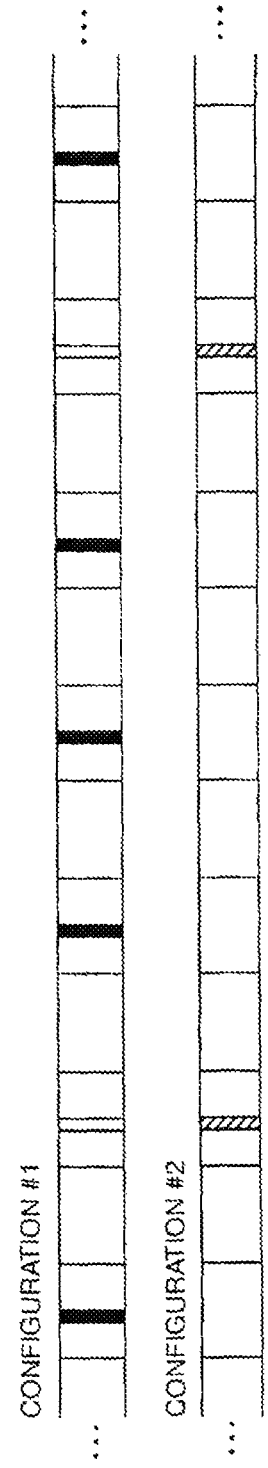
FIG. 4
FIG. 5

CHANNEL SOUNDING USING MULTIPLE SOUNDING CONFIGURATIONS

RELATED APPLICATIONS

This application is a continuation of U.S. patent application Ser. No. 12/672,324, filed 5 Feb. 2010, which is the National Stage of International Application No. PCT/EP2008/057559, filed 16 Jun. 2008, which claims the benefit of U.S. Provisional Application 60/954,734, filed 8 Aug. 2007, the disclosures of each of which are incorporated herein by reference in their entirety.

TECHNICAL FIELD

The present invention generally relates to uplink sounding reference signals, and particularly relates to configuring individual mobile terminals with a plurality of uplink sounding reference signal transmission parameters.

BACKGROUND

Uplink sounding reference signals are known signals transmitted on the uplink direction (i.e., mobile-terminal-to-network). Sounding reference signals can be used by the receiver (i.e., the base station) to estimate uplink channel quality, including the uplink channel quality for different frequency bands. The channel quality estimates can, for example, be used by an uplink scheduler located in the base station to determine a suitable uplink data rate (i.e., uplink rate control) or select a suitable frequency band for the uplink transmission for a given mobile terminal (also known as channel-dependent frequency-domain scheduling).

Uplink sounding reference signals can also be used by the receiver to estimate the timing of received signals. Such receive-timing estimates can be subsequently used by the network to adjust the mobile terminal transmit timing in order to time-align the receive timing of the uplink transmissions of different mobile terminals. Other uses of the uplink sounding reference signals are also possible.

In 3GPP LTE (3rd Generation Partnership Project Long Term Evolution), uplink sounding reference signals can be viewed as OFDM signals (Orthogonal Frequency-Division Multiplexing) in that the signals consist of a number of frequency sub-carriers with suitable modulation applied to each sub-carrier. More specifically, in case of LTE the modulation applied to the subcarriers is based on so called Zadoff-Chu sequences. An uplink sounding reference signal can be characterized in the frequency domain by the index of the first transmitted sub-carrier of the reference signal, the number of transmitted sub-carriers of the reference signal and the spacing between transmitted sub-carriers, also referred to as the repetition factor (RPF) of the reference signal.

Uplink sounding reference signals can also be characterized in the time domain. The LTE uplink time-domain structure includes subframes of 1 ms length. Each subframe has two equal-sized slots of 0.5 ms length, each slot including seven symbols. One symbol in each slot is used as a demodulation reference signal that cannot be mixed with sounding reference signals. The demodulation reference signals are used for uplink channel estimation to enable coherent uplink detection. The remaining symbols are typically used for data transmission. Thus, there are two demodulation reference symbols and twelve "data" symbols within each subframe.

If sounding reference signals are to be transmitted, a subset of the data symbols, e.g., every Mth data symbol, can be replaced by sounding reference signals. Typically, sounding reference signals are not transmitted in every subframe. Instead, one data symbol in every Nth subframe is replaced by a sounding reference signal, the sounding reference signal including a number of sub-carriers in the frequency domain as described above. The sounding reference signal can be characterized in the time domain by the period (measured in number of subframes) of the sounding reference signal, i.e., how often the reference signal is transmitted. The sounding reference signal can be further characterized in the time domain by the time offset of the sounding reference signal (measured in number of subframes) and the position of the sounding reference signal within the subframe, i.e., which data symbol has been replaced by the reference signal.

Different uses of uplink sounding reference signals may require different characteristics for the reference signals. For example, if a sounding reference signal is to be used for channel-quality estimation, a sounding reference signal of relatively narrow bandwidth (i.e., relatively few transmitted sub-carriers) may be sufficient if scheduling is only to be carried out over a limited bandwidth. However, the sounding reference signal is typically transmitted relatively often (i.e., relatively small period) in order to track relatively fast channel variations. On the other hand, for timing-estimation purposes, a relatively wideband reference signal may be needed to yield an accurate timing estimation. At the same time, a relatively long reference-signal period is sufficient for timing-estimation purposes as the propagation delay typically varies relatively slowly.

One conventional approach used for both channel-quality estimation and timing estimation purposes involves transmitting a sounding reference signal with wide bandwidth and high rate (i.e., small period). However, this conventional approach uses a relatively large amount of radio resources to transmit the sounding reference signal because of the wide bandwidth and high rate requirements. As such, fewer uplink symbols are available for data transmission. Accordingly, a less radio-resource intensive solution is desired.

SUMMARY

According to the methods and apparatus disclosed herein, more than one set of sounding signal configuration parameters are determined for the same mobile terminal. The configuration parameters may differ in the frequency-domain and/or the time-domain. The sets of configuration parameter are transmitted to the mobile terminal for use by the terminal in generating different sounding reference signals. Occasionally, more than one sounding reference signal may be transmitted simultaneously when multiple configurations are used. Priorities may be assigned to the different sets of configuration parameters for mitigating signal transmission conflicts. The configuration parameter having the highest priority controls which reference signal is transmitted when a conflict is expected to occur. Sounding reference signals transmitted by the mobile terminal can be used for different purposes such as estimating channel quality and timing.

In one embodiment, a method of configuring uplink sounding transmissions by mobile terminals in a wireless communication network is characterized by determining different sets of configuration parameters for sounding signal transmissions for a given mobile terminal. The different sets of configuration parameters are transmitted to the mobile terminal, allowing the mobile terminal to generate different sounding signals for different uses by the wireless communication network.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of an embodiment of different sounding signal configurations for a given mobile terminal.

FIG. 5 is a block diagram of another embodiment of different sounding signal configurations for a given mobile terminal.

DETAILED DESCRIPTION

Figure 1:
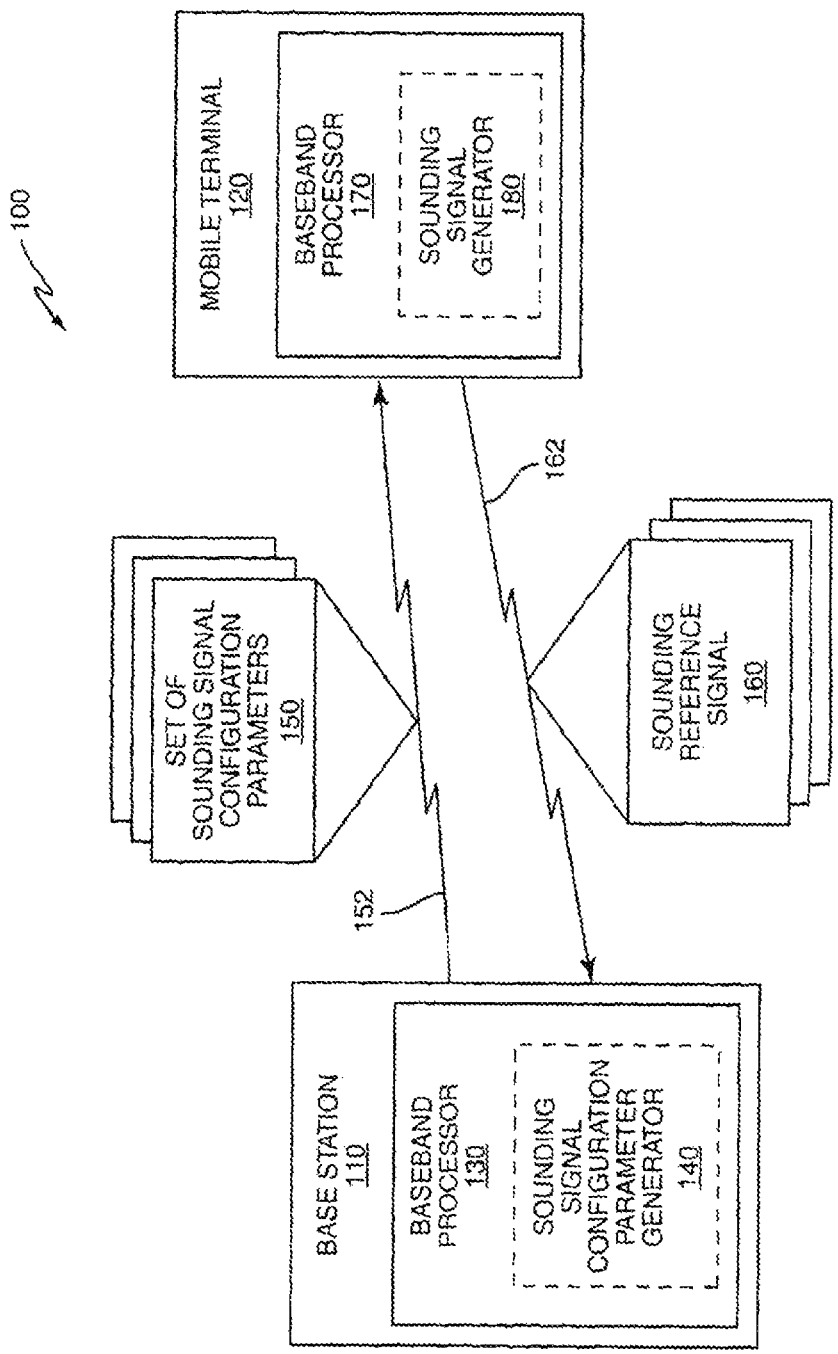
FIG. 1 is a block diagram of an embodiment of a wireless communication network including a base station that provides different sounding signal configurations for a given mobile terminal.
Figure 2:
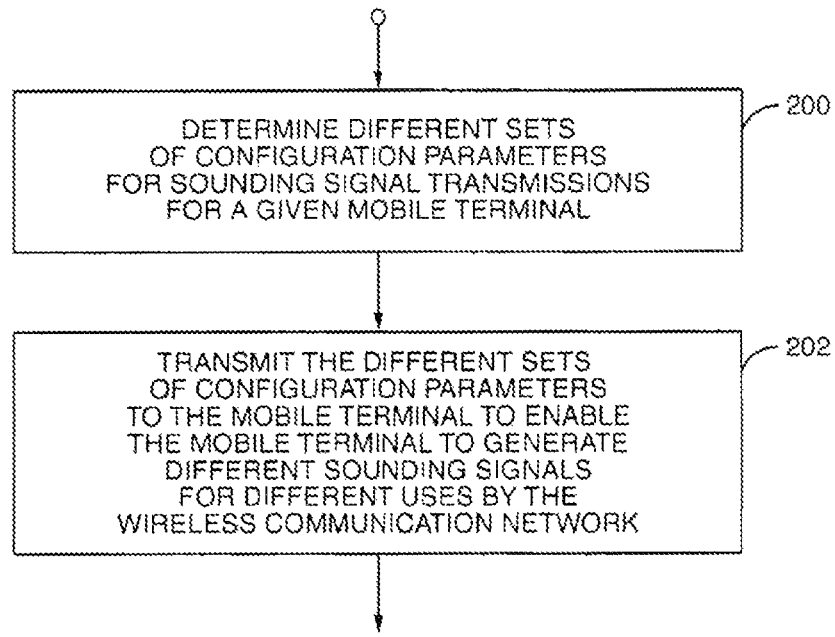
FIG. 2 is a flow diagram of an embodiment of program logic for providing different sounding signal configurations for a given mobile terminal.

FIG. 1 illustrates an embodiment of a wireless communication network 100 including a base station 110 that services one or more mobile terminals 120. The base station 110 includes a baseband processor 130. A parameter generator 140 included in or associated with the baseband processor 130 determines different sets 150 of configuration parameters for sounding signal transmissions for the mobile terminal 120, e.g., as illustrated by Step 200 of FIG. 2. The baseband processor 130 transmits the different sets 150 of configuration parameters to the mobile terminal 120 over a downlink communication channel 152, e.g., as illustrated by Step 202 of FIG. 2. The sets 150 of configuration parameters enable the mobile terminal 120 to generate different sounding signals 160 for different uses by the base station 110 such as channel-quality estimation and timing estimation.

Figure 3:
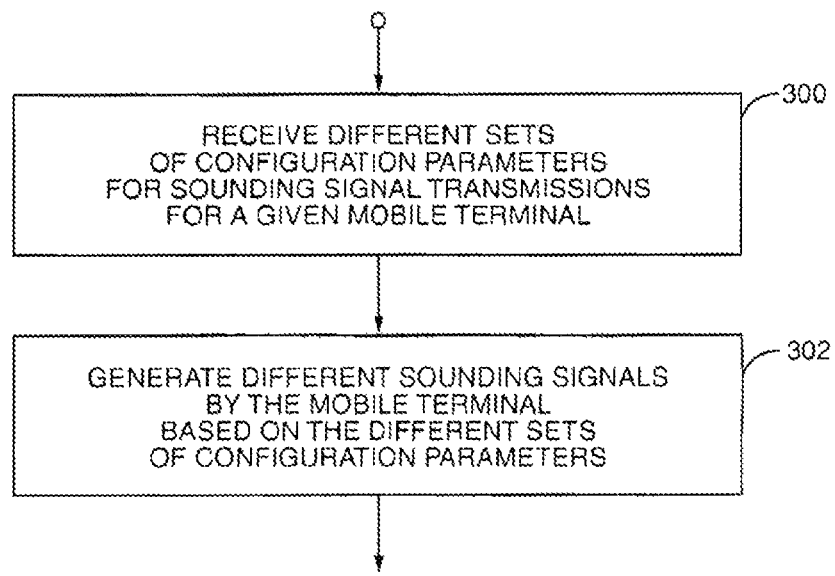
FIG. 3 is a flow diagram of an embodiment of program logic for generating different sounding signals by a given mobile terminal based on different sounding signal configurations.

The mobile terminal 120 has a baseband processor 170 for receiving the sets 150 of configuration parameters transmitted from the base station 110, e.g., as illustrated by Step 300 of FIG. 3. A sounding signal generator 180 included in or associated with the mobile terminal baseband processor 170 generates different sounding reference signals 160 based on the different sets 150 of configuration parameters, e.g., as illustrated by Step 302 of FIG. 3. The mobile terminal 120 transmits the sounding signals 160 to the base station 110 over an uplink communication link 162. This way, multiple sounding reference signal configurations having different frequency-domain and/or time-domain parameters can be used by the same mobile terminal 120 to generate different sounding reference signals 160.

According to one embodiment, one set 150 of the sounding signal configuration parameters causes the mobile terminal 120 to generate a first one of the sounding reference signals 160 with a relatively narrow bandwidth, but high rate in the time domain. A different set 150 of the sounding signal configuration parameters causes the mobile terminal 120 to generate a second one of the sounding reference signals 160 having a wider bandwidth, but lower time-domain rate. The first sounding signal can be used by the base station 110 for channel-quality estimation while the second sounding signal can be used for timing estimation.

Under some conditions, the different sets 150 of configuration parameters may create signal transmission conflicts at the mobile terminal 120 in that different sounding reference signal transmissions may occur within the same subframe or even within the same symbol, e.g., as illustrated in FIG. 4. Different priorities can be established or otherwise defined for the sets 150 of configuration parameters. The priorities allow the mobile terminal baseband processor 170 to determine which set 150 of configuration parameters should be used in the event of a sounding signal transmission collision. The configuration having the highest priority controls when more than one sounding reference signal transmission is expected to occur simultaneously, e.g., as illustrated in FIG. 5 where the second configuration (#2) has the highest priority. The prioritization may be explicit such that each sounding reference signal configuration is explicitly assigned a priority at configuration. Alternatively, the prioritization can be implicit, e.g., depending on the different configuration parameters. According to one embodiment, the configuration having the widest bandwidth (consisting of the largest number of transmitted sub-carriers) is given the highest priority. Other implied priorities may also be implemented by the mobile terminal baseband processor 170.

The embodiments described herein provide for the configuration, use and transmission of multiple sounding reference signal configurations to the same mobile terminal 120. The configurations may differ in bandwidth and/or the number of transmitted frequency sub-carriers. Additionally, or alternatively, the configurations may differ in the spacing between the transmitted sub-carriers (i.e. in the repetition factor), and/or in signal transmission rate. Additionally, or alternatively, the configurations may have different explicit or implied priorities for avoiding conflicting sounding reference signal transmissions expected to occur simultaneously (or just in the same sub-frame). In one embodiment, the base station 110 explicitly signals the configuration priorities to the mobile terminal 120.

Of course, other variations are contemplated. Thus, the foregoing description and the accompanying drawings represent non-limiting examples of the methods and apparatus taught herein for the transmission of system information. As such, the present invention is not limited by the foregoing description and accompanying drawings. Instead, the present invention is limited only by the following claims and their legal equivalents.

What is claimed is:

1. A method of configuring uplink sounding transmissions by mobile terminals in a wireless communication network, the method comprising:
   determining multiple different sets of configuration parameters for uplink sounding signal transmissions for a given mobile terminal, each of the multiple different sets of configuration parameters comprising frequency-domain and/or time-domain parameters; and
   transmitting the multiple different sets of configuration parameters to the mobile terminal, thereby enabling the mobile terminal to generate different sounding signals used by the wireless communication network to estimate different properties associated with at least one of uplink signals and uplink channels.

2. The method of claim 1, wherein determining multiple different sets of configuration parameters includes determining a first sounding signal bandwidth parameter for a first set of configuration parameters and a second sounding signal bandwidth parameter for a second set of configuration parameters, the mobile terminal configured to generate a first sounding signal according to the first set of configuration parameters and configured to generate a second sounding signal according to the second set of configuration parameters, the first sounding signal having a first band that is more narrow than a second band of the second sounding signal.

3. The method of claim 2, wherein the first and second sounding signal bandwidth parameters including transmission frequency parameters, and configuring the transmission frequency parameters such that the mobile terminal transmits the first sounding signal more frequently than the mobile terminal transmits the second sounding signal.

4. The method of claim 1, further comprising defining different priorities for each of the multiple different sets of configuration parameters, thereby allowing the mobile terminal to determine which set of configuration parameters should be used where a sounding signal transmission conflict occurs.

5. The method of claim 4, further comprising the mobile terminal configured to transmit a first sounding signal at first times according to a first set of configuration parameters and a second sounding signal at second times according to a second set of configuration parameters, and defining priorities for each of the multiple different sets of configuration parameters comprises defining whether the first or second sounding signal is to be transmitted for a case where the first and second times coincide.

6. The method of claim 4, further comprising transmitting the different priorities from the wireless communication network to the mobile terminal.

7. A base station comprising a baseband processor configured to:
    determine multiple different sets of configuration parameters for uplink sounding signal transmissions for a given mobile terminal, each of the multiple different sets of configuration parameters comprising frequency-domain and/or time-domain parameters; and
    transmit the multiple different sets of configuration parameters to the mobile terminal, thereby enabling the mobile terminal to generate different sounding signals used by the base station to estimate different properties associated with at least one of uplink signals and uplink channels.

8. The base station of claim 7, wherein the baseband processor is configured to determine a first sounding signal bandwidth parameter for a first set of configuration parameters and a second sounding signal bandwidth parameter for a second set of configuration parameters, the mobile terminal configured to generate a first sounding signal according to the first set of configuration parameters and configured to generate a second sounding signal according to the second set of configuration parameters, the first sounding signal having a first band that is more narrow than a second band of the second sounding signal.

9. The base station of claim 8, wherein the first and second sounding signal bandwidth parameters including transmission frequency parameters, and the baseband processor is configured to set the transmission frequency parameters such that the mobile terminal transmits the first sounding signal more frequently than the mobile terminal transmits the second sounding signal.

10. The base station of claim 7, wherein the baseband processor is further configured to define different priorities for each of the multiple different sets of configuration parameters, thereby allowing the mobile terminal to determine which set of configuration parameters should be used where a sounding signal transmission conflict occurs.

11. The base station of claim 10, wherein the baseband processor is configured to define first sounding signal transmission times for a first set of configuration parameters and second sounding signal transmission times for a second set of configuration parameters, and to define whether the first or second set of configuration parameters has a higher priority when the first and second sounding signal transmission times coincide.

12. The base station of claim 11, wherein the baseband processor is further configured to transmit the different priorities to the mobile terminal.

13. A method of configuring uplink sounding transmissions by a given mobile terminal, the method comprising:
    receiving, from a base station, multiple different sets of configuration parameters for uplink sounding signal transmissions for the mobile terminal, each of the multiple different sets of configuration parameters comprising frequency-domain and/or time-domain parameters; and
    generating different sounding signals by the mobile terminal based on the multiple different sets of configuration parameters, each of said different sounding signals used by the base station to estimate different properties associated with at least one of uplink signals and uplink channels.

14. The method of claim 13, wherein receiving multiple different sets of configuration parameters includes receiving a first sounding signal bandwidth parameter for a first set of configuration parameters and a second sounding signal bandwidth parameter for a second set of configuration parameters.

15. The method of claim 14, further comprising:
    generating a first sounding signal according to the first set of configuration parameters; and
    generating a second sounding signal according to the second set of configuration parameters,
    wherein the first sounding signal has a first band that is more narrow than a second band of the second sounding signal.

16. The method of claim 15, wherein the first sounding signal is generated more frequently than the second sounding signal.

17. The method of claim 13, further comprising determining which set of configuration parameters are to be used when a sounding signal transmission conflict occurs.

18. The method of claim 17, wherein determining which set of configuration parameter are to be used is based on different received priorities for each of the multiple different sets of configuration parameters.

19. A mobile terminal comprising a baseband processor configured to:
    receive, from a base station, multiple different sets of configuration parameters for uplink sounding signal transmissions for the mobile terminal, each of the multiple different sets of configuration parameters comprising frequency-domain and/or time-domain parameters; and
    generate different sounding signals based on the multiple different sets of configuration parameters, each of said different sounding signals used by the base station to estimate different properties associated with at least one of uplink signals and uplink channels.

20. The mobile terminal of claim 19, wherein the baseband processor is configured to receive a first sounding signal bandwidth parameter for a first set of configuration parameters and a second sounding signal bandwidth parameter for a second set of configuration parameters.

21. The mobile terminal of claim 20, wherein the baseband processor is further configured to:
   generate a first sounding signal according to the first set of configuration parameters; and
   generate a second sounding signal according to the second set of configuration parameters,
   wherein the first sounding signal has a first band that is more narrow than a second band of the second sounding signal.

22. The mobile terminal of claim 21, wherein the baseband processor is further configured to generate the first sounding signal more frequently than the second sounding signal.

23. The mobile terminal of claim 19, wherein the baseband processor is further configured to determine which set of configuration parameters are to be used when a sounding signal transmission conflict occurs.

24. The mobile terminal of claim 23, wherein the baseband processor is further configured to determine which set of configuration parameters are to be used based on different received priorities for each of the multiple different sets of configuration parameters.

\* \* \* \* \*